United States Patent
Hartmann et al.

(10) Patent No.: US 8,751,046 B2
(45) Date of Patent: Jun. 10, 2014

(54) ROTARY CONNECTION COUPLING

(75) Inventors: Gerhard Hartmann, Biberbach (DE);
Andreas Bernsau, Augsburg (DE);
Jürgen Radler, Jettigen Scheppach (DE)

(73) Assignee: KUKA Systems GmbH, Augsburg (DE)

( * ) Notice: Subject to any disclaimer, the term of this patent is extended or adjusted under 35 U.S.C. 154(b) by 1053 days.

(21) Appl. No.: 12/671,561

(22) PCT Filed: Jul. 28, 2008

(86) PCT No.: PCT/EP2008/006202
§ 371 (c)(1),
(2), (4) Date: Feb. 1, 2010

(87) PCT Pub. No.: WO2009/015850
PCT Pub. Date: Feb. 5, 2009

(65) Prior Publication Data
US 2010/0291310 A1    Nov. 18, 2010

(30) Foreign Application Priority Data

Aug. 2, 2007  (DE) ............... 20 2007 010 812 U
Mar. 18, 2008  (DE) ............... 20 2008 003 757 U

(51) Int. Cl.
| B05D 1/02 | (2006.01) |
| B25J 17/02 | (2006.01) |
| F16J 15/02 | (2006.01) |
| B25J 18/00 | (2006.01) |
| B25J 19/02 | (2006.01) |
| B05C 5/00 | (2006.01) |

(52) U.S. Cl.
USPC ........... 700/259; 118/712; 118/715; 118/323; 901/29; 901/43; 901/46; 74/490.06

(58) Field of Classification Search
USPC .................. 901/47, 29, 43, 46; 414/754, 935; 700/259; 74/490.06
See application file for complete search history.

(56) References Cited

U.S. PATENT DOCUMENTS

| 4,626,013 | A | | 12/1986 | Barrows |
| 4,945,429 | A | | 7/1990 | Munro et al. |
| 5,959,425 | A | * | 9/1999 | Bieman et al. ........... 318/568.15 |
| 5,974,643 | A | | 11/1999 | Hays et al. |

FOREIGN PATENT DOCUMENTS

| DE | 1570 45 | 10/1982 |
| DE | 32 44 053 | 6/1983 |
| DE | 34 09 689 | 6/1985 |
| DE | 37 17 765 | 1/1988 |

(Continued)

Primary Examiner — Parviz Hassanzadeh
Assistant Examiner — Nathan K Ford
(74) Attorney, Agent, or Firm — McGlew and Tuttle, P.C.

(57) ABSTRACT

A rotary coupling for a multi-axial robot hand (19) is provided with a rotatable hand housing (20) and an output element (21) that is rotatable on said housing. The rotary coupling (62) includes connections (65, 66, 68) for the output element (21), a tool (23) and an accessory unit (30). The tool (23) and the accessory unit (30) can be rotated relative to each other, and the accessory unit (30) can be coupled to the hand housing (20) or to the tool (23) or to the output element (21) via the rotary coupling (62). The rotary coupling (62) is provided for an application device (11) which is used to apply a sealant (8) on a lock seam (7) of an add-on piece (4) of a vehicle body (3).

13 Claims, 16 Drawing Sheets

(56) References Cited

FOREIGN PATENT DOCUMENTS

| | | |
|---|---|---|
| DE | 87 09 013.9 | 10/1988 |
| DE | 199 45 537 | 8/2000 |
| EP | 0 110 644 | 6/1984 |
| EP | 0 205 288 | 12/1986 |
| EP | 0 537 923 A2 | 4/1993 |
| EP | 0 873 826 A2 | 10/1998 |
| EP | 1 447 183 | 8/2004 |
| JP | 52 075762 | 6/1977 |
| JP | 60113782 | 6/1985 |
| JP | 07232110 | 9/1995 |
| JP | 2004 136371 | 5/2004 |
| WO | WO 93/17836 | 9/1993 |
| WO | WO 96/13354 | 5/1996 |
| WO | WO 2006/035259 | 4/2006 |

* cited by examiner

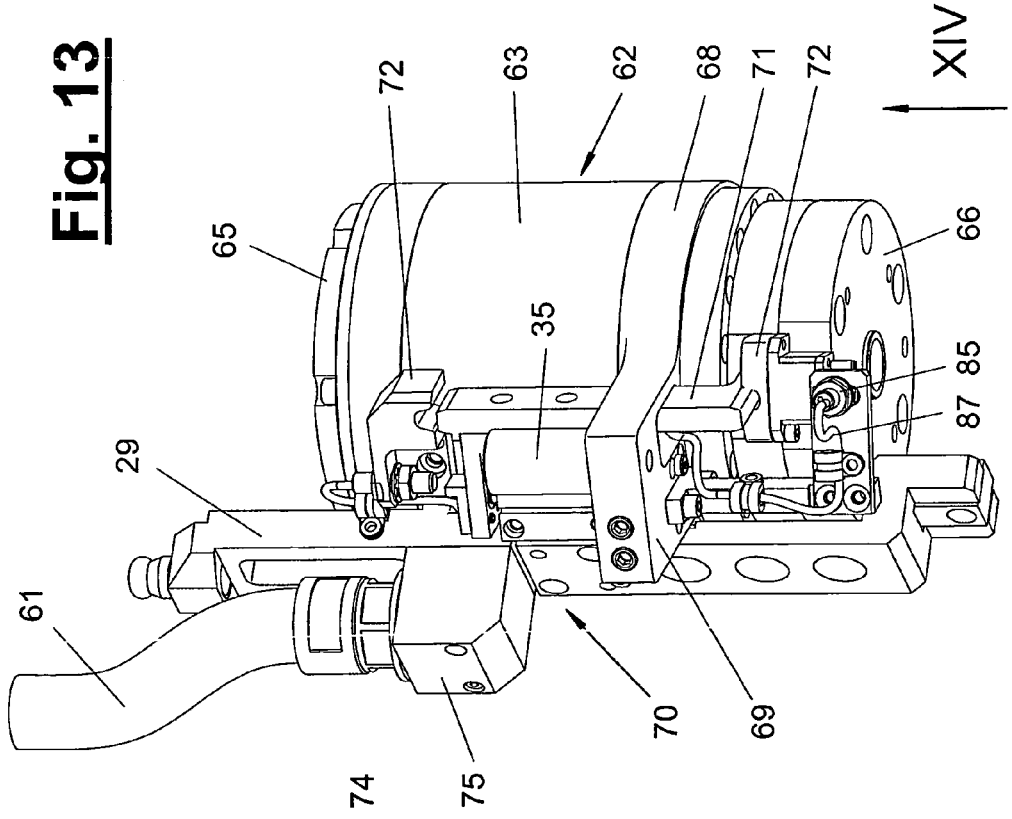

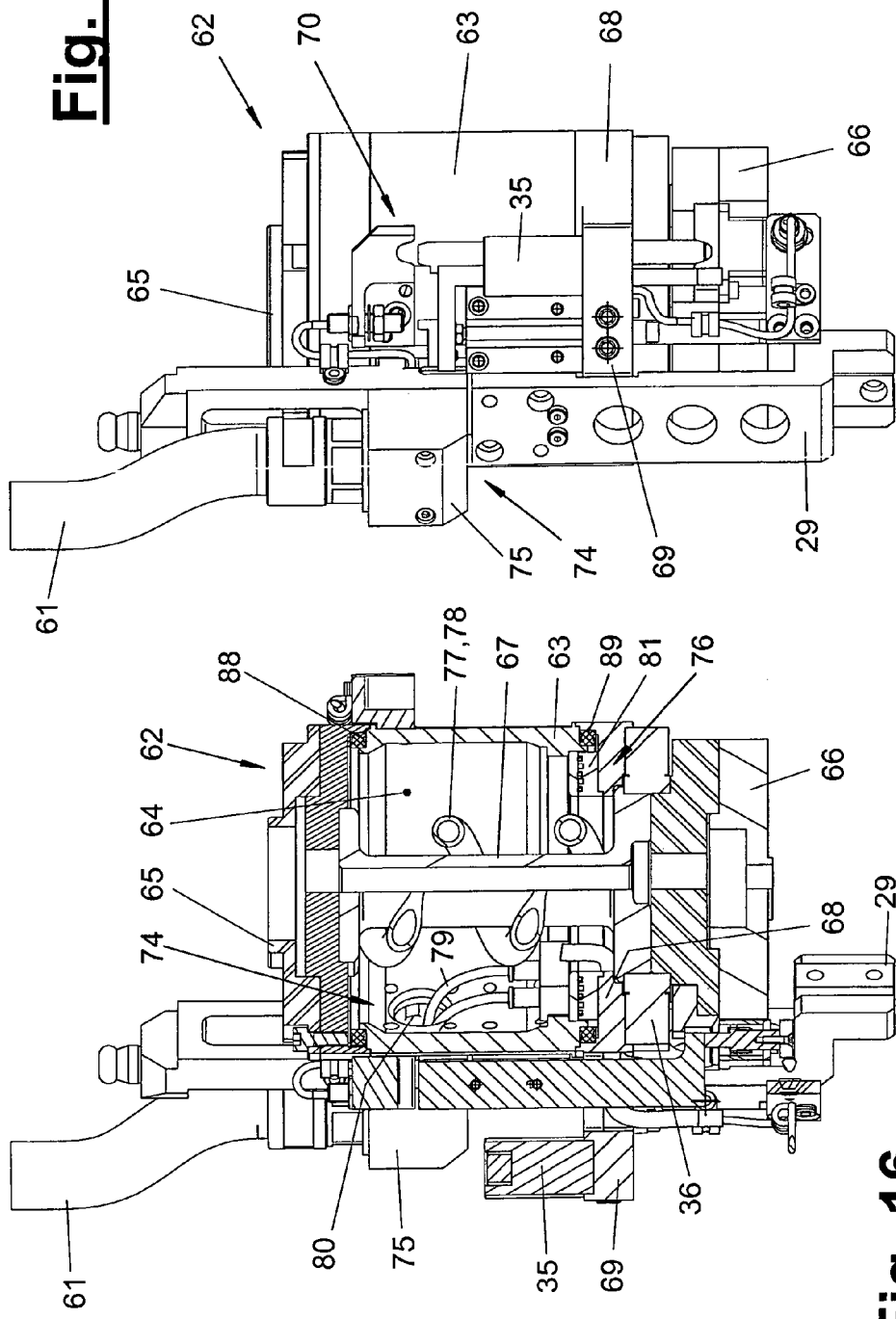

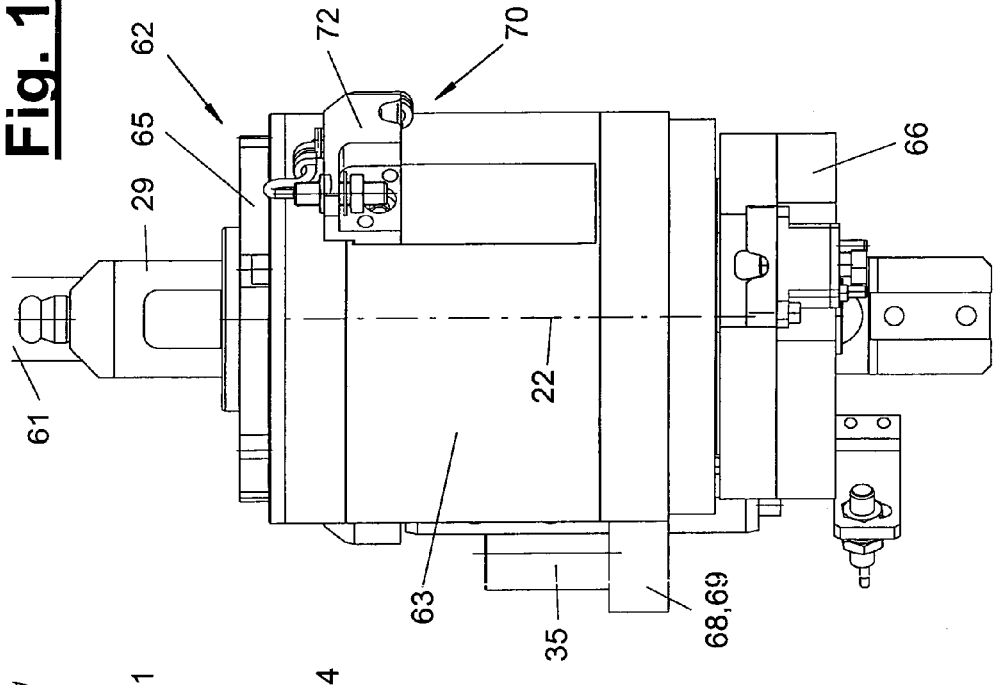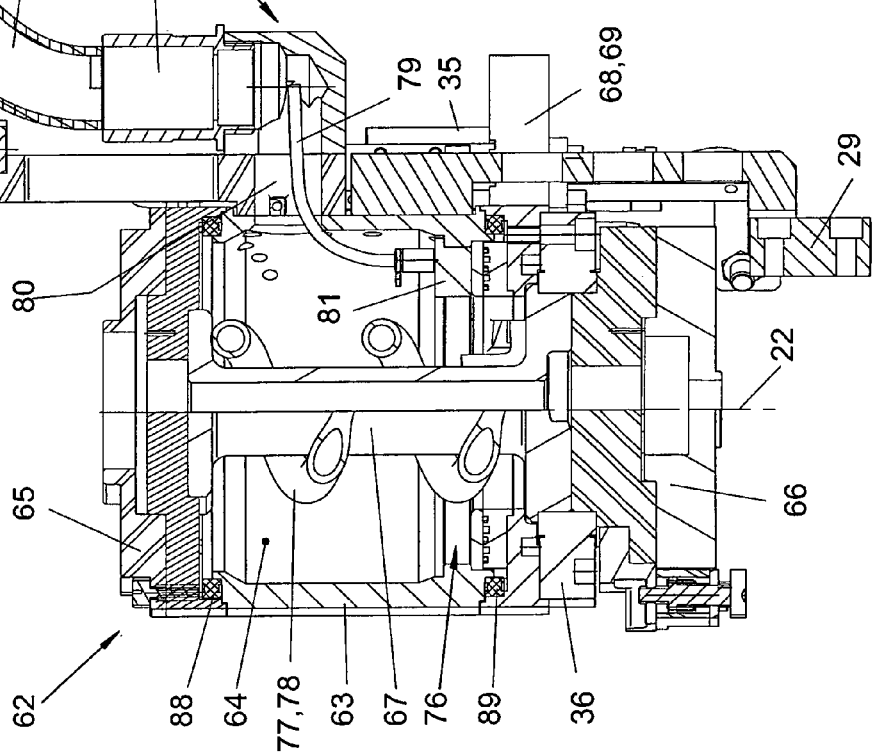

ROTARY CONNECTION COUPLING

CROSS REFERENCE TO RELATED APPLICATIONS

This application is a United States National Phase application of International Application PCT/EP2008/006202 and claims the benefit of priority under 35 U.S.C. §119 of DE 20 2007 010 812.5 filed Aug. 2, 2007 and 20 2008 003 757.3 filed Mar. 18, 2008, the entire contents of each of which are incorporated herein by reference.

FIELD OF THE INVENTION

The present invention pertains to a rotary connection coupling for a multiaxial robot hand with a movable, especially rotatable hand housing and with a driven member rotatable thereon.

BACKGROUND OF THE INVENTION

Robot-guided tools are connected in practice directly to the driven flange of a multiaxial robot hand. In addition, change couplings are used when a tool change is desired. Only one tool can be coupled with the robot hand in case of change couplings as well. The tools may have auxiliary axes if need be.

It is, furthermore, known from practice and common to provide hemmed flanges or so-called lock seams on body components with a protective seal. This is important above all on so-called add-on parts in which the lock seams are located in the visible area in the finished vehicle. Such add-on parts are, e.g., doors and hinged flaps, such as trunk lids and engine hoods, but also sliding roofs, etc. These add-on parts are already provided with the seal during the manufacturing process after hemming or rebating. This is carried out prior to the mounting of the add-on parts by means of drag bearings or the like on the body. This involves the risk of damage to the seal during the subsequent handling and mounting operations. In addition, sealing is performed prior to the priming of the body or the corrosion protection treatment. As a result, there is no optimal corrosion protection at the lock seam, which may be critical especially in respect to crevice corrosion in the bent and folded area. The early application of the seal in the manufacturing process of the add-on part does, furthermore, call for the additional arrangement of a heating means or an oven or inductive gelling unit in order to subject the sealant and adhesive possibly introduced into the flange area to heat treatment and pregelling.

SUMMARY OF THE INVENTION

Therefore, the object of the present invention is to show an improved possibility of connection for equipment or tools to a robot.

The present invention accomplishes this object with the features in the principal claim.

The rotary connection coupling according to the present invention makes it possible to arrange a plurality of tools and attachments on the robot hand together and next to each other, wherein the attachment can be optionally coupled with or uncoupled from the tool by means of a coupling means in such a way that they are connected in a rotationally engaged manner. During uncoupling it can be connected to a hand housing of the robot hand, optionally via a moment support, in such a way that they rotate in unison.

This offers advantages in terms of process technology for the attachment, which can be moved and especially rotated together with the tool when needed in order to cooperate with this correspondingly. This is advantageous, for example, when the attachment is a measuring means, with which the work station can be observed in advance offline or online during the work process and the function of the tool can be monitored. When not needed, the attachment may be uncoupled and remain in a position that is not critical in terms of interference. Furthermore, it is possible to move two or more such devices in relation to one another by performing a specified additional motion with the hand housing.

The rotary connection coupling being claimed can be used for any desired tools or equipment and work processes. There are special advantages for an applicator and an application tool as well as an application process for pasty or liquid sealants.

The present invention pertains, furthermore, to an integrated line routing for supplying attachments, which can be used in an especially advantageous manner in connection with the rotary connection coupling being claimed, but which is advantageous in other cases and in other couplings as well. Lines that are critical in terms of load and interference, e.g., signal lines for measured signals of an attachment, may be led in a spiral guide between line connections, which substantially reduces the load and hence the fault liability. Other, less critical lines may be routed via a rotatable media coupling, e.g., in the form of a slip ring. The integrated line routing has for both types of connection the advantage that the lines can be routed from the robot to the attachment in a manner favorable in terms of load. In particular, the external line connection can now be connected to the hand housing of the robot hand directly or via a moment support in such a way that they rotate in unison. Starting from this external line connection, the line routing may be laid along one or more robot arms likewise in a favorable manner in terms of load and interference. In particular, it is possible to route all or at least a large part of the lines needed for the one or more tools or devices in one bundle and to install them along one or more robot arms up to the area of the robot hand.

The application of a seal on already mounted add-on parts limits the accessibility to the lock seams and to the application points for the sealant. In addition, the lock seams usually point towards the inside of the vehicle and are not visible from the outside in the closed position of the add-on parts. Therefore, the application of the sealant cannot usually be checked visually. To solve this problem, the present invention provides for an applicator that permits such a hidden application with high precision and also offers a possibility of access through narrow gaps at articulation points of the add-on parts, especially at the edge of the component provided with the hinge. The present invention proposes an especially suitable applicator herefor. To ensure exact positioning of the applicator, accurate measurement of the add-on parts is possible for the working position, which is intended for the application of the seal and is possibly an opened position. The add-on part is also fixed in this working position, so that the applicator can be guided with the highest precision after analysis of the measuring result and the sealant can also be applied at hidden hemmed areas with the highest precision and quality.

It is favorable for the sealing process to globally measure the vehicle body in the processing position. Possibly existing opening and holding means for the add-on part can be accurately controlled according to this measuring result. Furthermore, pre-positioning of the applicator and of the measuring means carried along is possible. This saves time and increases the accuracy of measurement. As an alternative, a vehicle body, whose dimensions are known, can be positioned so accurately that global measurement can be reduced or eliminated.

It may be favorable in case of a vehicle body with a plurality of add-on parts to bring at first all add-on parts into a predetermined and opened or closed working position and to fix them in this position as well as to subsequently measure them locally with the measuring means carried along by the applicator. The sealant application is subsequently performed on the basis of the measuring results, the manipulator and applicator being controlled correspondingly. The sealant can be applied to all add-on parts, which is preferably carried out without applying pressure and in a contactless manner to this extent. Undesired actions of forces on the add-on parts and the vehicle body as well as possible changes in the position of the vehicle body and of the add-on parts, which are associated therewith, are avoided. For the same reason, the add-on parts are released again and optionally moved into the closed position only after conclusion of all sealant applications.

The present invention is schematically shown in the drawings as an example. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 12 is a perspective view of the rotary connection coupling;

FIG. 13 is another perspective view of the rotary connection coupling;

FIG. 16 is a sectional view through the rotary connection coupling according to section line XVI-XVI in FIG. 14 and a tilted side view;

FIG. 17 is a tilted side view of the rotary connection coupling;

FIG. 18 is a sectional view through the rotary connection coupling according to section line XVIII-XVIII in FIG. 15 and a tilted side view;

FIG. 19 is another tilted side view of the rotary connection coupling;

DESCRIPTION OF THE PREFERRED EMBODIMENTS

Figure 1:
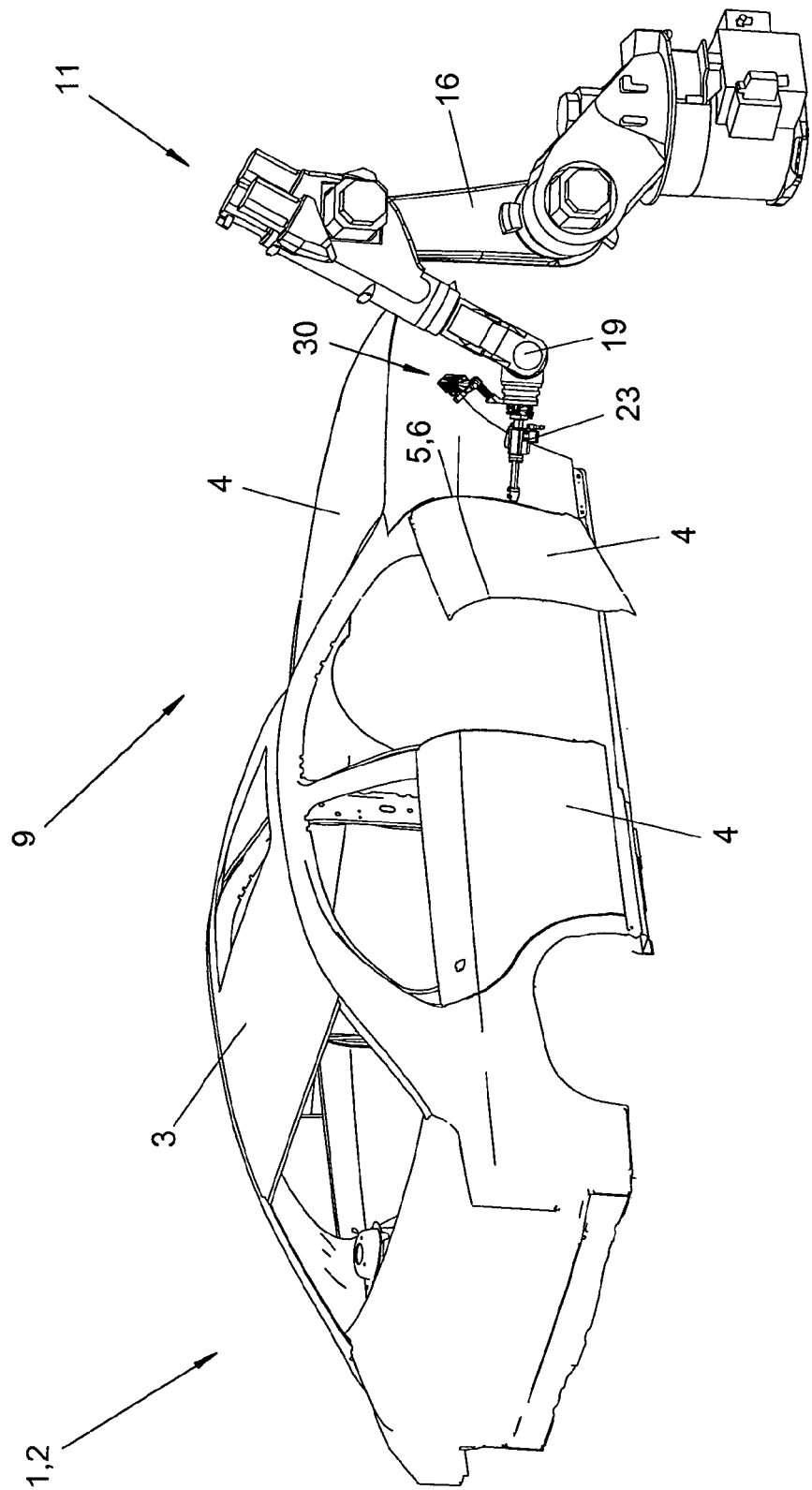
FIG. 1 is a perspective view of a working device with a robot-guided tool in the working position at a vehicle body.

Referring to the drawings in particular, the present invention pertains to a working device (11) with one or more robot-guided tools (23) and additional devices or other attachments (30), especially a measuring means carried along, and with a rotary connection coupling (62). It pertains, in particular, to the rotary connection coupling (62) and to an integrated line routing (74).

The present invention pertains, furthermore, to a process for applying a sealant (8) at a flange (7) of an add-on part (4) of a vehicle body (3) and to an embodiment of the working device (11) as an applicator for the sealant.

The vehicle body (3) may be intended for any desired vehicle. In the embodiment being shown it is a road vehicle, especially a passenger car or truck.

As an alternative, the vehicle body (3) may be intended for any other land vehicle, watercraft and aircraft as desired, and have a correspondingly different shape. The vehicle body (3) consists of any desired material, especially metal, plastic or composites. The vehicle body (3) has one or more add-on parts (4). These are components that are mounted movably at openings of the vehicle body (3), e.g., vehicle doors, trunk lid, engine hood or the like. The add-on parts (4) may likewise consist of any desired material, especially metal.

Figure 2:
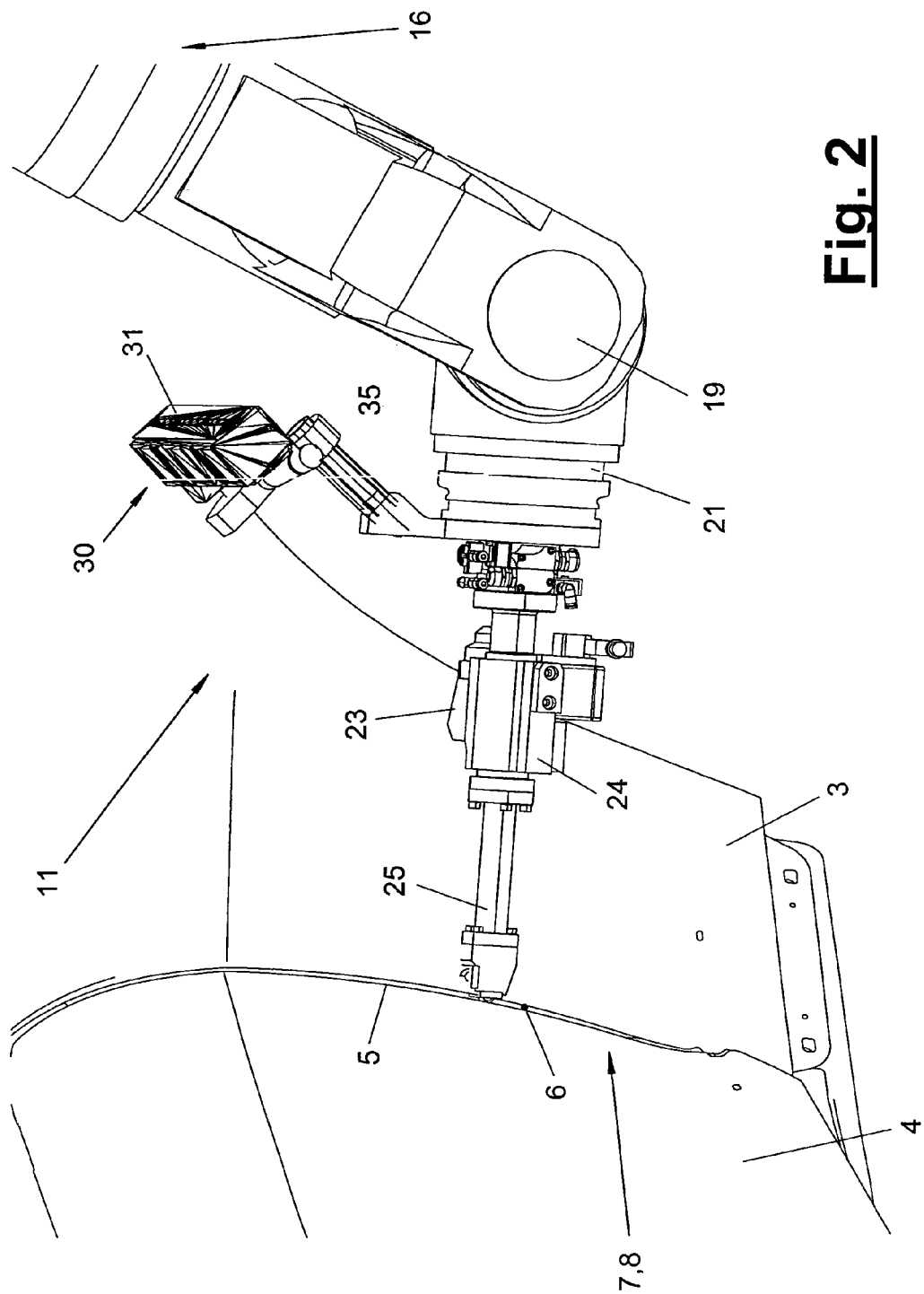
FIG. 2 is an enlarged detail view of the device according to FIG. 1.

The add-on parts (4) have a multilayer design and have one or more flanges (7) or lock seams, which are only suggested in FIG. 2 and which are usually located in the proximity of edges or borders (5) of components and extend along same. These may be outer borders or inner borders of openings in components. An adhesive may have been introduced in the border or contact area of the sheet metals. It may be a rapidly curing adhesive, especially a two-component adhesive, which is not compromised thanks to rapid curing during subsequent processes, especially a corrosive protection treatment, and is not washed out. A protective seal is applied on the outside at the end of the bent flange and of the stepped transition area formed there towards the inner sheet metal. It consists of a suitable sealant of any desired material composition and consistency. It is preferably a liquid or pasty sealant, which can be applied to the transition area by a working device (11) or applicator by means of a nozzle (26). The application is carried out largely without force and without the nozzle (26) making contact with the flange. The sealant is applied along a component edge (5) preferably continuously and without interruption. The application is possibly interrupted only in the corner areas or at another transition to another component edge (5) and a lock seam located there, and the next application begins with an overlap. Sharp corner areas may also be covered with a swinging-out bend and with a correspondingly controlled discharge. The sealant is delivered and applied essentially continuously, and the discharge can be controlled and metered. The aforementioned brief interruption of discharge is possible for reorienting the nozzle (26) at sharp corner areas.

The applicator (11) is shown in FIGS. 1 through 11 and will be described in more detail below. The applicator (11) may be part of a processing means (9), especially a sealing means, which may contain additional components besides one or more applicators (11). These may be, e.g., a measuring means, a cleaning device, a testing means, an opening means and a holding means.

The processing means (9) may in turn be part of at least one processing station (2), especially of a so-called sealing station. The sealing station (2) may in turn be part of a manufacturing plant (1) for a vehicle.

The sealant is applied at an add-on part (4) after the latter has been mounted on the vehicle body (3) by means of one or more hinges, guides or the like. This already mounted component position is called mounted position. The add-on part (4) may be opened for applying the sealant in case of insufficient accessibility to a lock seam, which may happen within the processing station (2) and is performed by the aforementioned opening means.

The flanges to be sealed are located in the exemplary embodiment being shown on the side of the add-on parts (4) pointing towards the interior space of the vehicle and may possibly be accessible for space reasons only after said add-on parts have been opened. The add-on part (4) may adjoin the surrounding border area of the body opening, e.g., very tightly. The add-on part (4), for example, the vehicle door shown in FIGS. 1 and 2, is opened now only partly, and a narrow gap (6) is formed towards the adjacent area of the body on the articulation side of the vehicle door and at the component edge (5) located there. The hidden flange is accessible through this gap (6) from the rear side for the applicator (11). The other lock seams can also be reached in the opened position.

FIGS. 1 through 4 illustrate the working device or applicator (11). The applicator (11) is movable multiaxially and is intended and designed for sealant application on a mounted and opened add-on part (4). A measuring means (30) is carried along by the applicator (11).

In the exemplary embodiments being shown the applicator (11) comprises a multiaxial manipulator (16), which is preferably designed as an articulated arm robot with at least six rotatory axes and with a multiaxial robot hand (19). As an alternative, the manipulator (16) may have another axis configuration with rotatory and/or translatory axes. In the embodiment being shown the multiaxial robot hand (19) has two or three rotatory axes IV, V and VI. The manipulator hand (19) has a housing (20), which is pivotable about the transversely extending hand axis V in a fork at the end of the last robot arm or extension arm, wherein said fork may be rotatable about the hand axis IV extending along the extension arm. The last hand axis VI forms the driven axis (22) and has a movable driven member (21), e.g., a rotatable driven flange, which may be mounted in or at the hand housing (20). A moment support (29), which is rigidly connected to the housing and extends along the hand axis VI and extends beyond the driven member (21), may be located at the hand housing (20).

Figure 3:
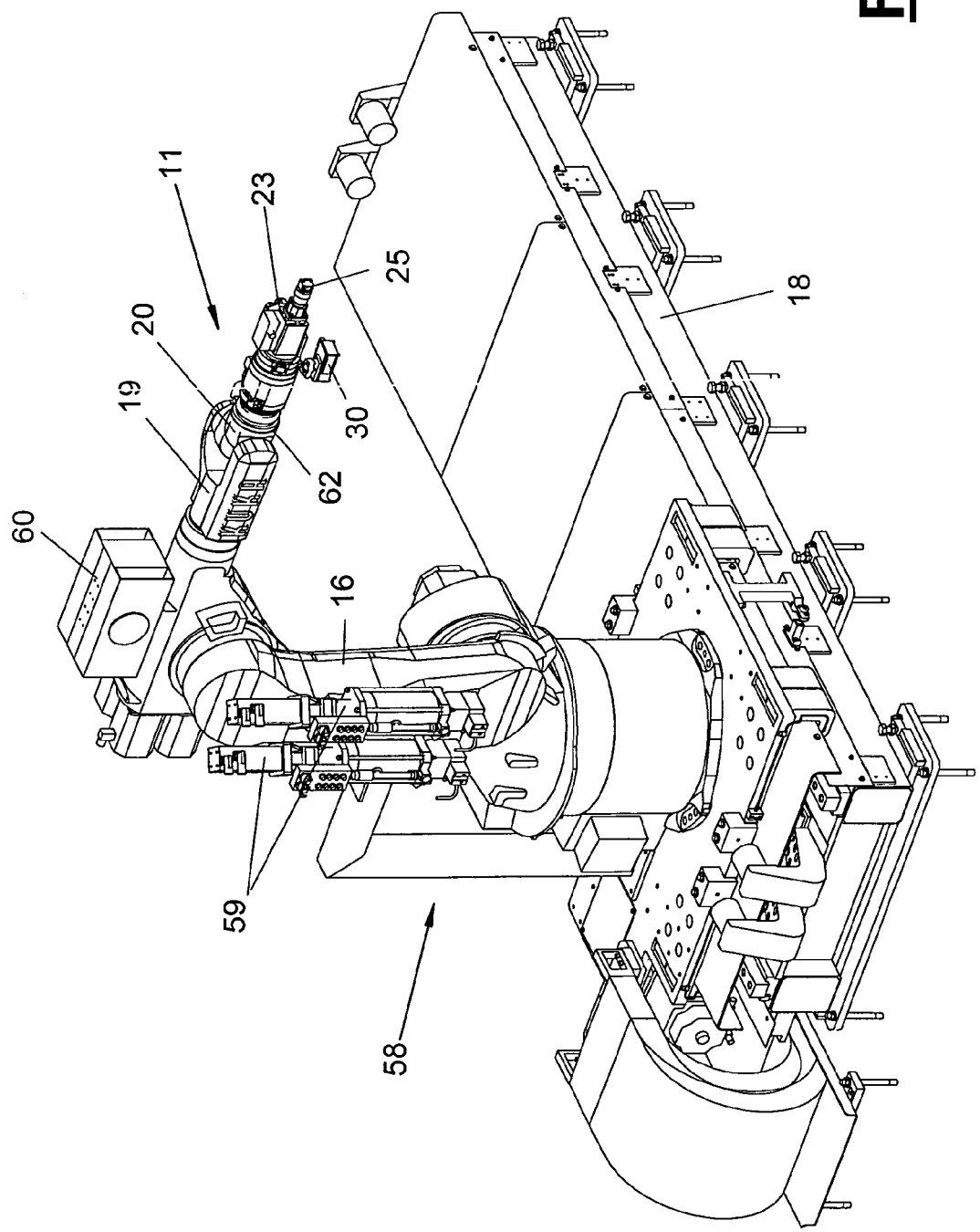
FIG. 3 is a perspective of a view of a variant of the working device.
Figure 4:
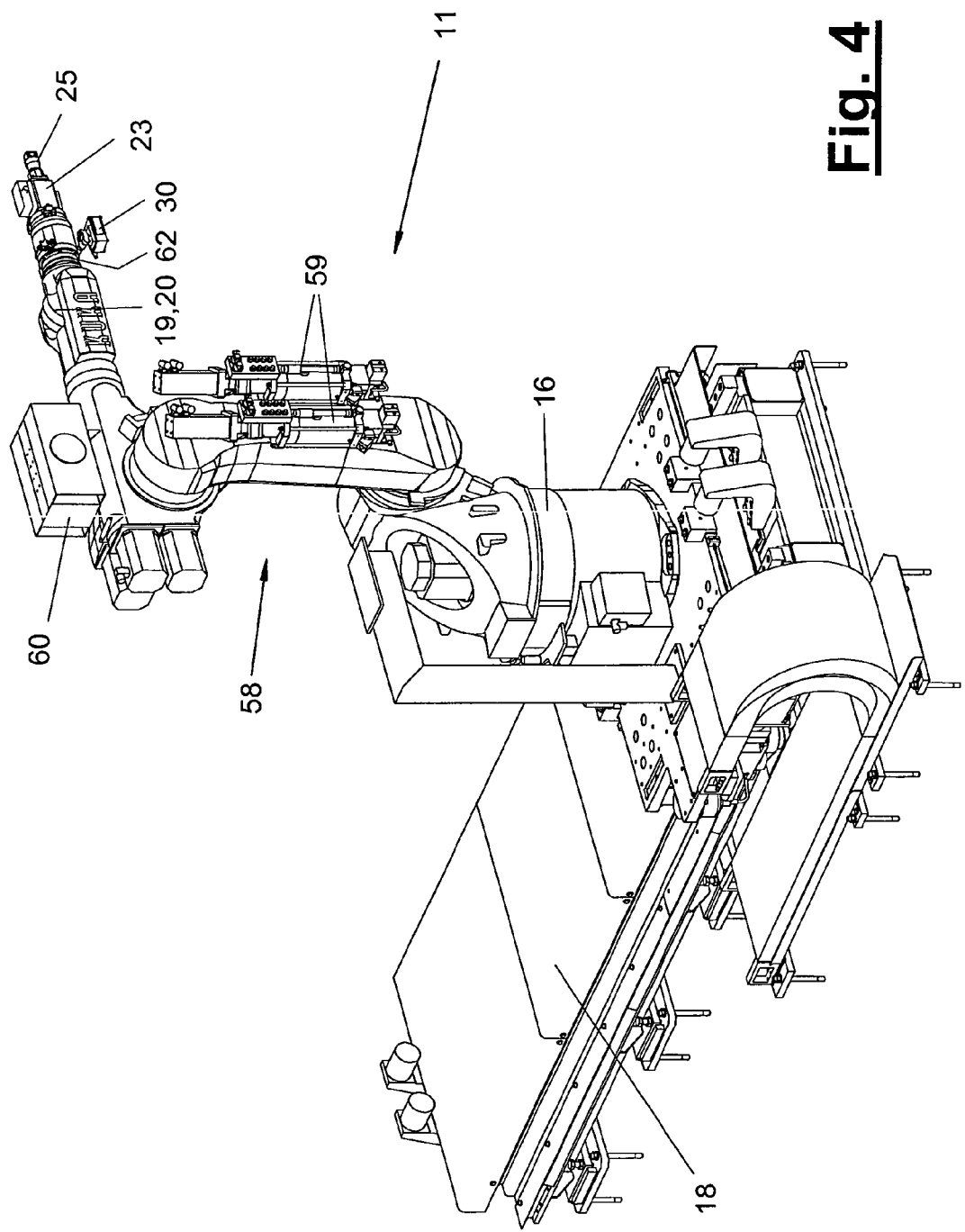
FIG. 4 is a perspective of another view of the variant of the working device.
Figure 5:
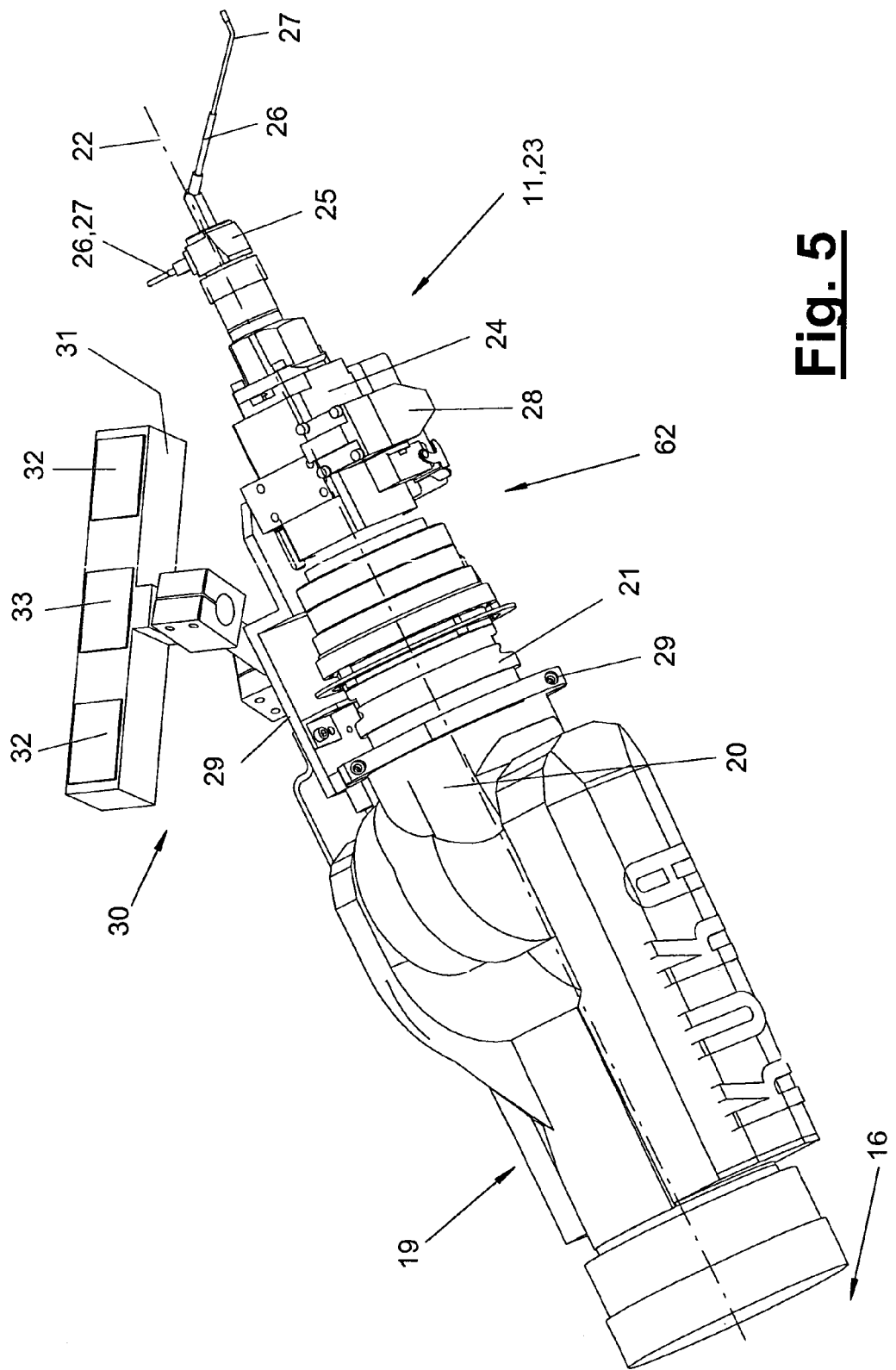
FIG. 5 is a perspective view of an applicator with a tool arranged on a robot hand and with a measuring means carried along.
Figure 6:
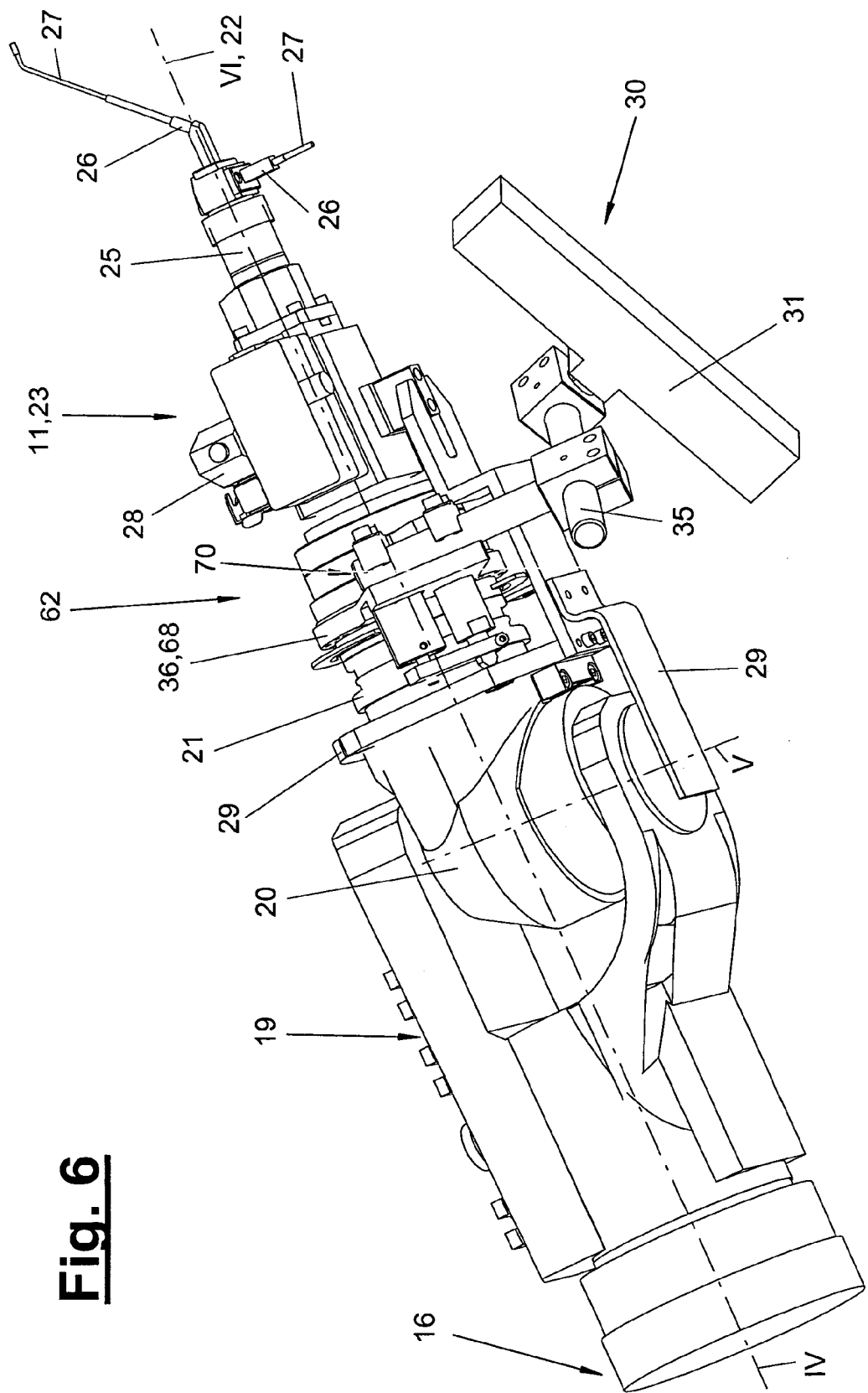
FIG. 6 is another view of an applicator with a tool arranged on a robot hand and with a measuring means carried along.

As is illustrated in FIGS. 3 and 4, robot (16) may be arranged on a conveying means (18), which offers one or more additional axes and makes possible the travel of the robot (16) along the vehicle body (3) in the longitudinal and/or transverse direction. The conveying means (18) is designed in the embodiment being shown as a linear unit with a closed guide system with recirculating roller shoe as well as a trailing cable installation and has a walkable cover. As an alternative, the manipulator or robot (16) may be stationary and floor-mounted or portal-mounted.

Manipulator (16) carries on its manipulator hand (19) an applicator (23) for the sealant (8) and also the measuring means (30). FIGS. 1 through 6 illustrate this embodiment and also show the axis geometries explained below.

The applicator (23) has, e.g., a body (24), which is connected to the housing (20) of the manipulator hand (19) by means of the moment support (29) or the like such that they rotate in unison. As a result, body (24) follows the motions of the hand about the orthogonal axes IV and V. One or more line connections (28) are arranged at the body (24) on the outside. Furthermore, other operating materials, e.g., power currents and signal currents, compressed air, cooling fluid or the like, can be supplied via the line connections (28). A heating means possibly arranged in the applicator (23) for the sealant (8) can also be supplied with energy and controlled via these operating materials.

The applicator (23) has, furthermore, an applicator head (25) with one or more application members for the sealant, which are not shown for clarity's sake. The applicator head (25) is mounted movably in the body (24), especially rotatable about the driven axis (22). A corresponding rotatable line routing (not shown) is present in the body for the sealant feed into the rotatable applicator head (25). The applicator head (25) is connected on the rear side to the driven flange (21) of the manipulator hand (19) via a rotary connection coupling (62) and can be rotated relative to the body (24) via the robot axis VI or the driven axis (22). As a result, the one or more application members can be positioned in space and oriented as desired via the six robot axes.

In the embodiment being shown for a pasty or liquid sealant, the application members are designed as nozzles, and the applicator head (25) is a nozzle head, from which the nozzles (26) are fed. The necessary feed pressure is ensured by a metering means (58) with pumps or possibly also in the applicator (23). According to FIGS. 3 and 4, the metering means (59), which may possibly be a double metering means, is attached, e.g., laterally to the rocker of the robot (16), which may, in addition, also carry a cooling and/or heating means (60) on the third robot arm.

A plurality of nozzles (26) may be arranged at the nozzle head (25) on different sides and these nozzles may have different designs. The nozzles (26) have each a nozzle tube (27) projecting from the nozzle head (25). For the gap situation shown in FIGS. 1 and 2, the nozzle tube (27) may have a thickness adapted to the gap width (6) and, in addition, a bent shape, so that it can be inserted through the gap (6) and moved along the course of the gap, and the nozzle opening can be positioned and oriented in relation to the flange in a suitable manner. The manipulator (16) may perform corresponding multiaxial arm and hand motions for a preferably continuous application motion along the course of the gap (6), which course may possibly be bent in space, and along the lock seam. An articulated arm robot is especially suitable for this. Support may be offered via the seventh travel axis. As an alternative, the seventh axis may be used for the rapid repositioning of the robot (16) to the other edge (5) of the component or the lock seam.

The other nozzle (26) may be of a simpler design for the other lock seams that can be reached more easily on the underside and the rear side of the vehicle door, which rear side is located opposite the door hinges, and have a straight nozzle tube (27). This [nozzle tube] may also have a shorter length than the above-described nozzle tube (27) for the sealant application through the gap (6).

Due to the independent rotatability of the nozzle head (25) and the nozzles (26), rapid and unhindered reorientation of the nozzles is possible. The body (24) with the line connections (28) and with the connected supply lines (not shown) for the nozzle head (25) does not need to follow these motions and may have limited kinematics, which makes do with one or two fewer axes. The supply lines come from a line feed (61), which is shown in more detail in FIGS. 10 through 21.

The measuring means (30) connected to the applicator (21) and carried along has the advantage that it makes use of the same flange coordinate system to which the TCP (Tool Center Point) at the front end of the nozzle or nozzles (26) is related as well. The accuracy of measurement is increased hereby.

The variant of the measuring means (30) shown in FIGS. 5 through 9 has a measuring head (31) with an adjustable frame (35). Frame (35) may be connected to a rotary part (68) of a rotary connection coupling (62), which may be mounted rotatably about the driven axis (22) at the applicator (23), especially at the body (24), e.g., by means of a pivot bearing (36). The rotary connection coupling (62) has a coupling means (70) with a plurality of controllable coupling elements (71, 72) and, e.g., two coupling points (37, 38). These permit, depending on the actuation of the coupling means (70), coupling with the moment support (29) or the hand housing (20) or with the applicator head (25) or with the driven member (21). The measuring means (30) can obtain favorable kinematics for the process as a result.

Coupling with the applicator head (25) and with the driven axis (22) may be present for the initial measurement of the add-on parts (4), so that all robot axes are available for the measurement, which can be performed in a correspondingly accurate manner. The measuring means (30) can be moved now by the hand axis motions and optionally also motions of the robot arm axes along the application-relevant reference points of the add-on part (4), e.g., along the edges (5) of the component, and scan these. The exact shape, position and orientation of the add-on part (4) and of the lock seams, which are hidden and are usually related to the edges (5) of the component, are determined from the measuring result. The flange width at the flange is known, and the hemming operation is accurate in terms of its geometry and leads to a defined component edge or hemmed edge (5). The position of the end of the flange and of the transition point for the positioning of the sealant can be calculated from this with sufficient accuracy.

Figure 7:
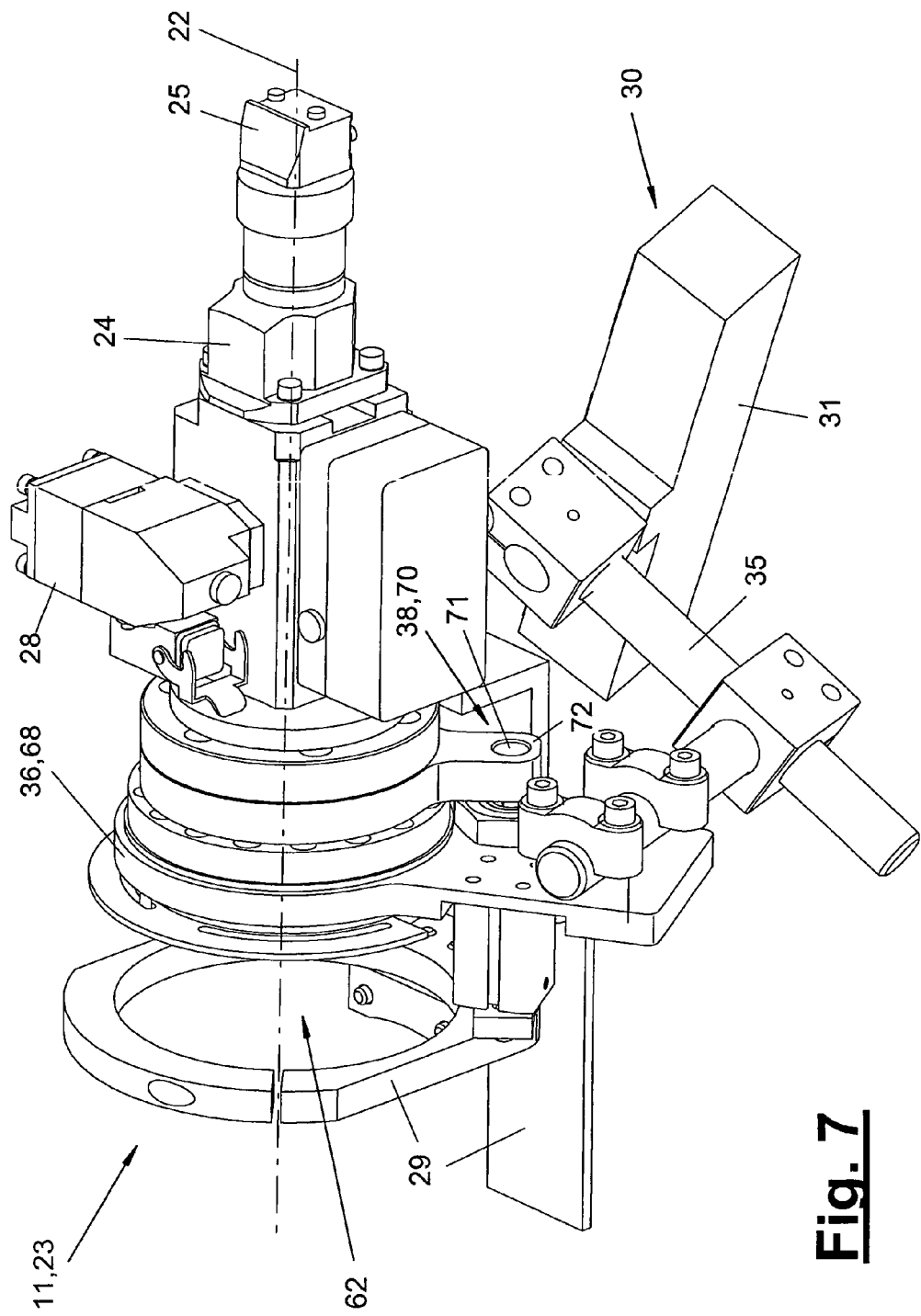
FIG. 7 is perspective view of the tool and of the measuring means in a coupled position.
Figure 8:
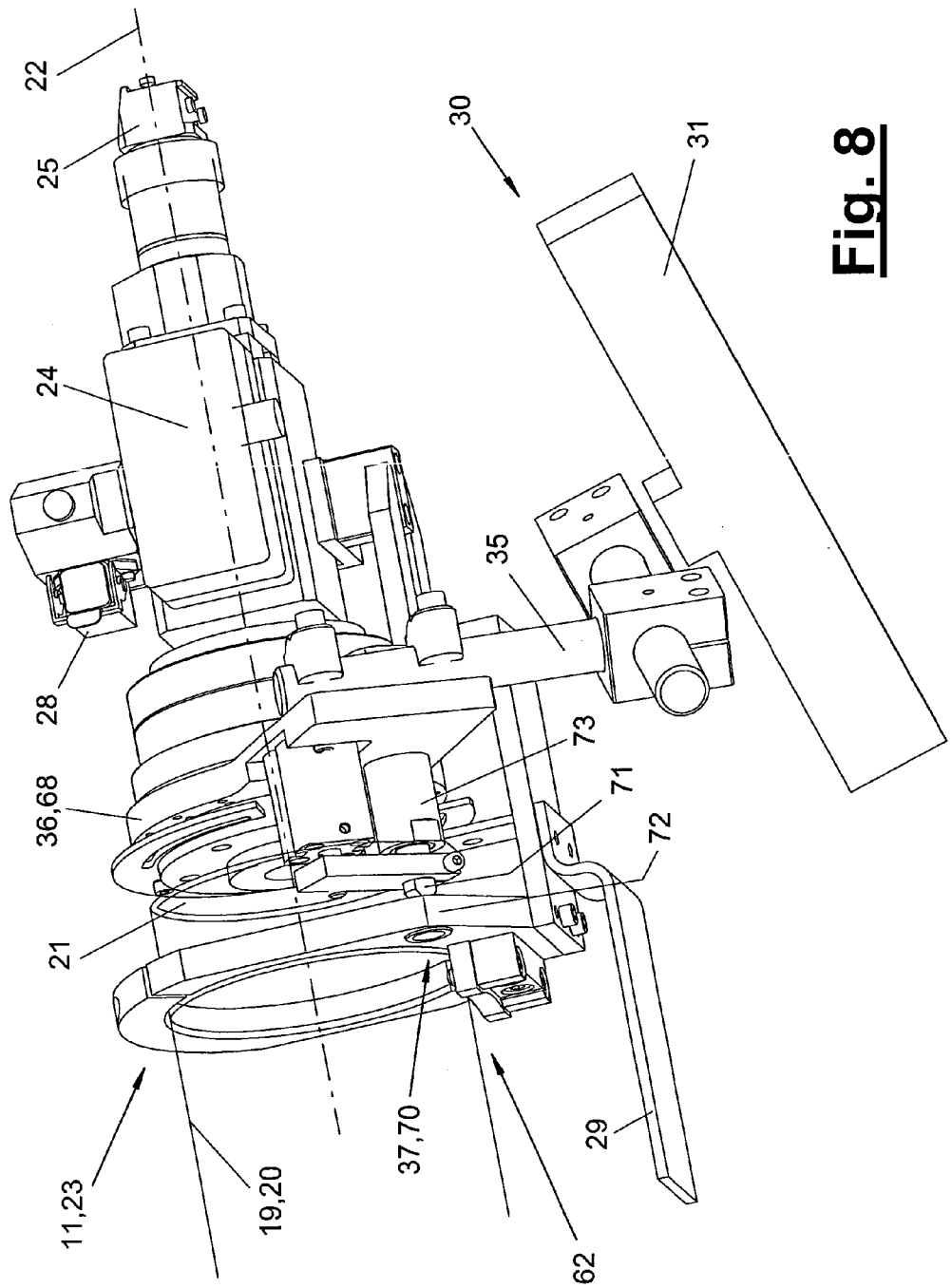
FIG. 8 is perspective view of the tool and of the measuring means in another coupled position.
Figure 9:
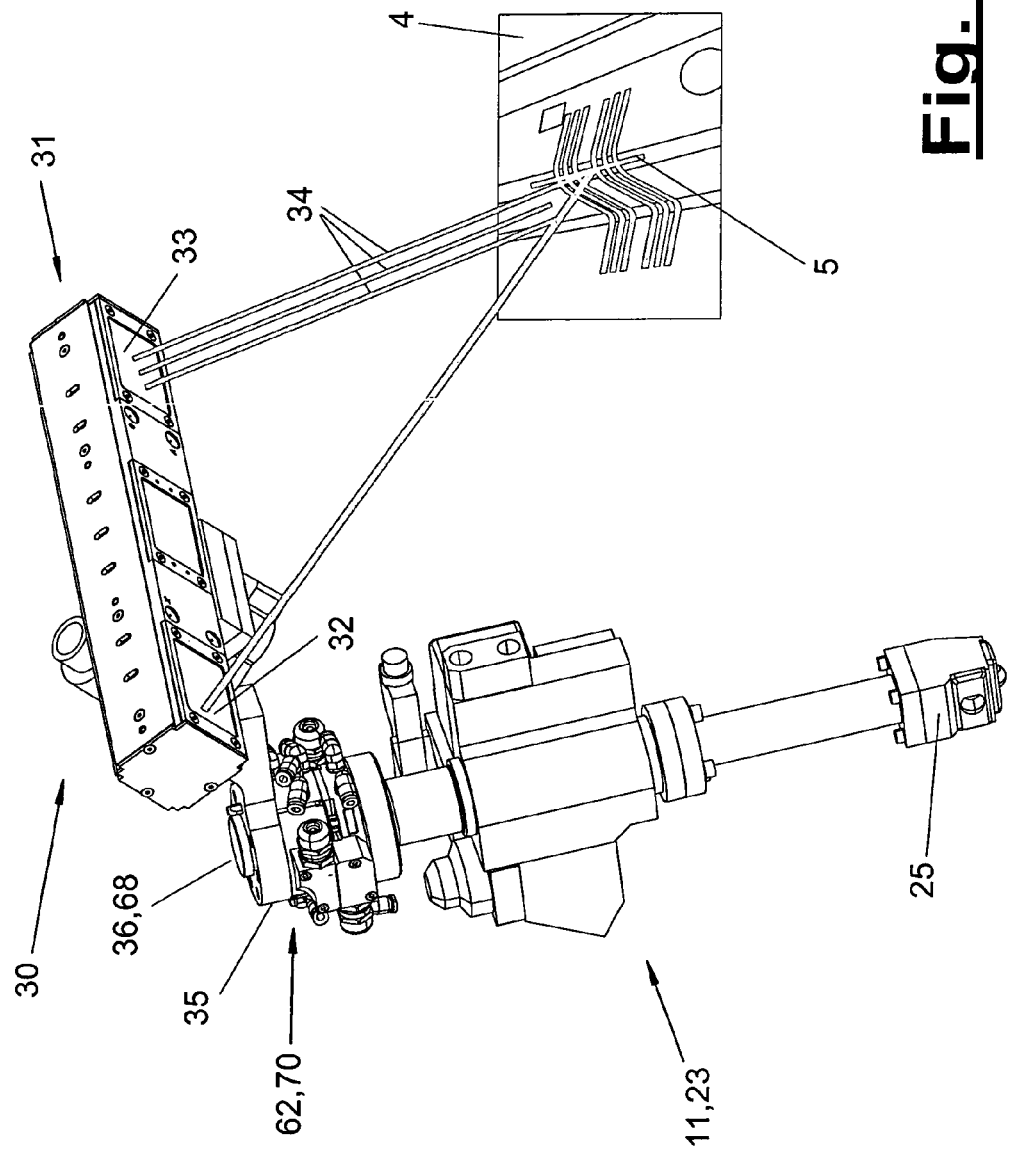
FIG. 9 is a perspective functional view of the measuring means at the tool.

FIG. 7 shows the coupling means (70) at the coupling point (38) in conjunction with the driven axis (22). FIG. 8 shows the other coupling point (37), at which there is meshing with the moment support (29). Due to a rotation of the applicator head (25), the rotary part (68) can be brought into a corresponding rotated position, in which the coupling means (70) is released at the coupling point (38) and is actuated at coupling point (37). The measuring means (30) can then have the same kinematics as the body (24). This coupled position is intended during the sealant application and likewise facilitates unhindered orientation of the application members (26). The lines connected to the measuring means (30) are not shown in the embodiment according to FIGS. 5 through 9. They need to be moved to a limited extent only or not at all during the sealant application.

Coupling means (70) comprises a coupling drive (73), which is arranged at the rotary part (68) and acts on a movable coupling element (71) likewise located at the rotary part (68), e.g., on an axially displaceable stop bolt. A stationary coupling element (72), which is designed as an insertion opening for the stop bolt (71), is located at the moment support (29). The insertion opening may be located at a support ring connected on the front side to the hand housing (20). The coupling point (37) is formed hereby.

Another, relatively stationary coupling element (72) may be located at a passed-through extension of the rotary coupling (62), which is connected to the driven axis (22) and at which the working head (25) is connected. The other coupling point (38) is formed hereby.

The measuring head (31) intended for performing the measurements may have any design as desired and operate according to any desired measuring method. Contactless optical measurement is used in the embodiment shown in FIG. 9, in which case the measuring head (31) has a housing with, e.g., two radiation sources (33) and with a sensor (32) arranged next to it. One radiation source (33) emits a plurality of parallel measuring beams (34) to the add-on part (4) for detecting a stepped contour of the component or an edge (5) of the component. A light source (33), which emits a plurality of parallel thin streaks of light (34), is provided in the embodiment being shown. The kinks of the light traces occurring at the edge (5) of the component are optically detected and their location is measured. They yield, when connected, the shape of the edge.

The other radiation or light source (33) emits a dense bundle of light beams (34) to illuminate the surface and to optically detect and measure the borders of holes or other openings.

Sensor (32) is designed as a 3D sensor for measuring the steps or component edges (5) or borders of holes in space on the basis of the visible streaks of light (34) or light bundles and has, e.g., an image analysis unit with a light-section and/or gray-level evaluation method.

As an alternative, camera systems with image acquisition and image analysis are possible. Other measuring techniques with capacitive or inductive edge scanners and distance sensors as well as contact-based measuring techniques are possible.

The cleaning devices mentioned in the introduction and the testing means for the application members (26) are arranged in the working range of the applicator (11) and especially of the manipulator (16). These means may have any desired and suitable design.

The applicator (11) and the sealing means (9) with the various components may have one or more suitable controls. A station control may be present as well. The applicators (23) and the sealant supply means are preferably controlled by the robot control of the corresponding robot (16). The testing and cleaning device (12, 13) may also be connected hereto. The controls of the various manipulators (16, 17) are linked to one another and the functions of these manipulators are coordinated with one another.

As a complement to the embodiments shown, a subsequent quality control of the seals (8) is additionally possible. This may happen, e.g., with a separate testing means. As an alternative, the measuring means (30) present may be used with a suitable image detection and image analysis. The add-on parts (4) can be opened more widely for the quality control.

FIGS. 11 through 21 show a variant of the rotary connection coupling (62) and an integrated line routing (74).

Figure 10:
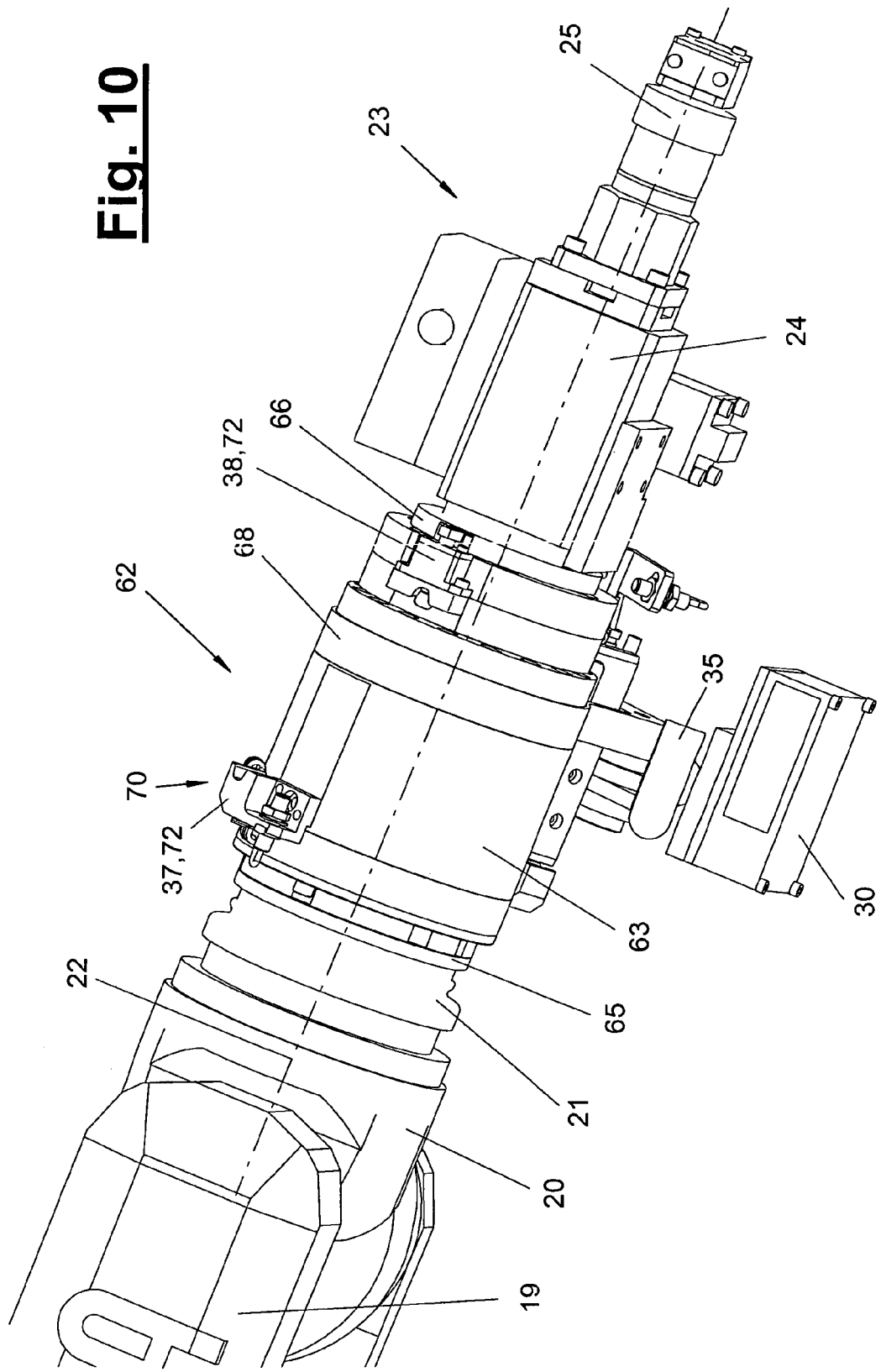
FIG. 10 is a perspective view of a variant of the tool with a rotary connection coupling and with a measuring means carried along at the robot hand.
Figure 11:
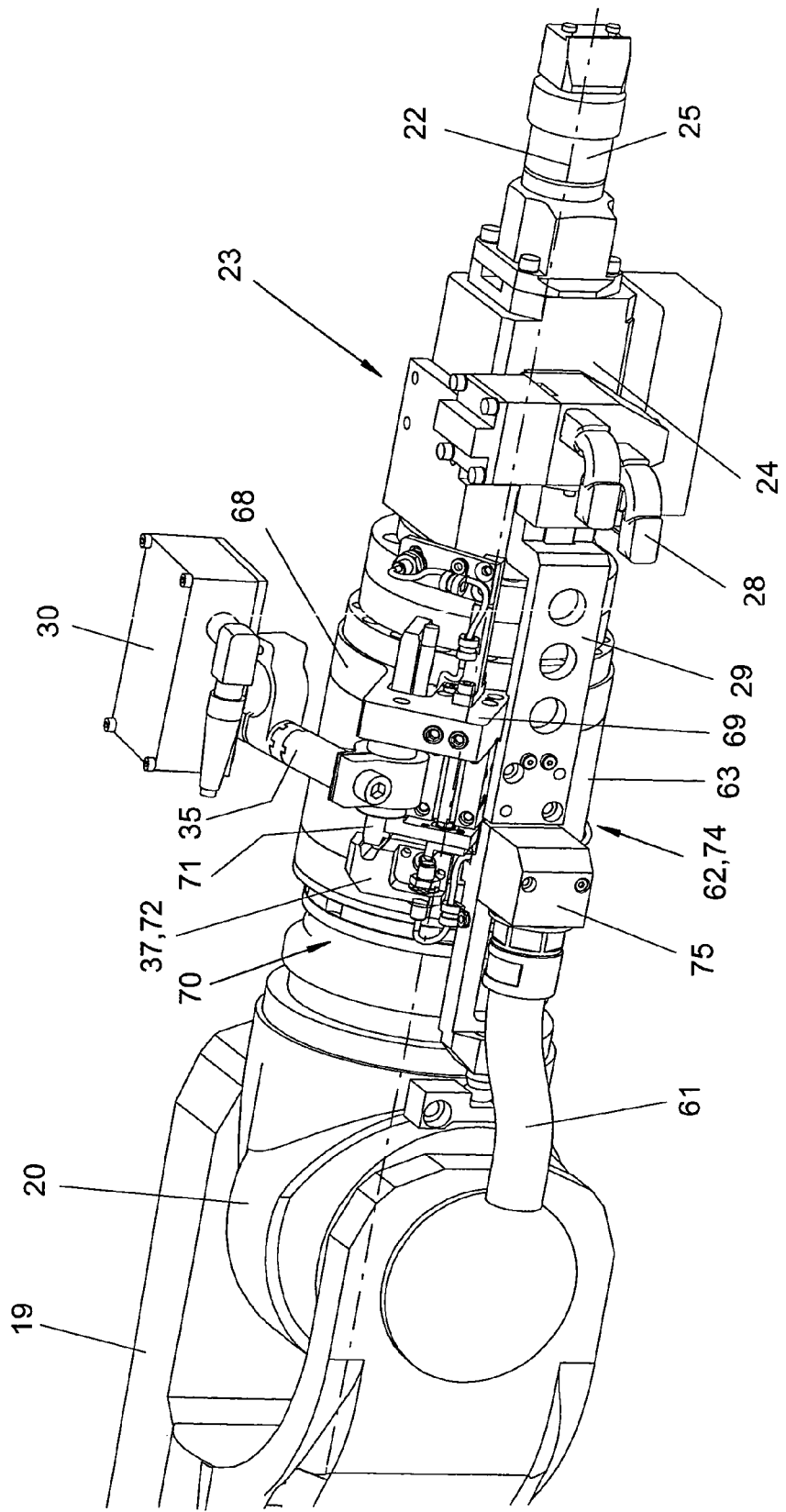
FIG. 11 is another perspective view of the variant of the tool with a rotary connection coupling and with a measuring means carried along at the robot hand.
Figure 14:
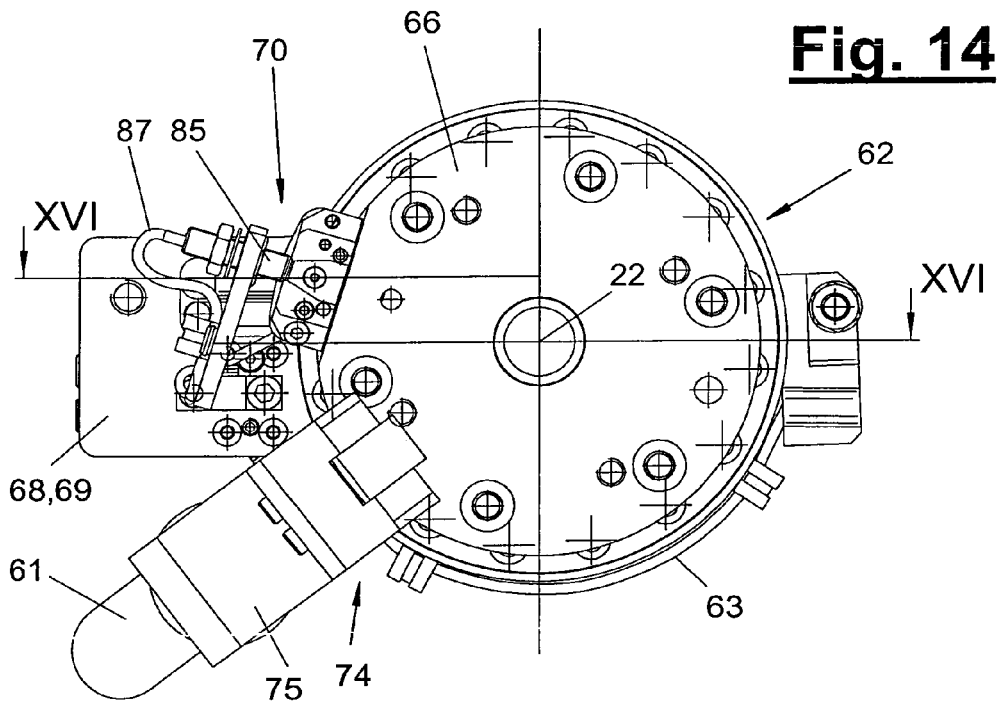
FIG. 14 is a coupling view from the top.
Figure 15:
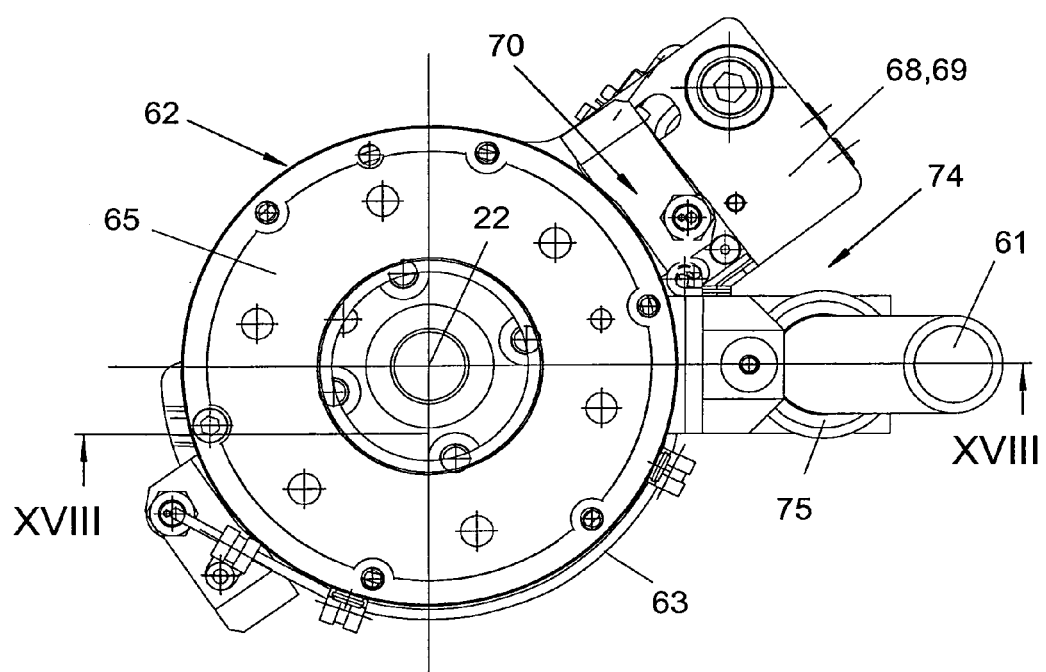
FIG. 15 is a coupling view from the bottom.
Figure 21:
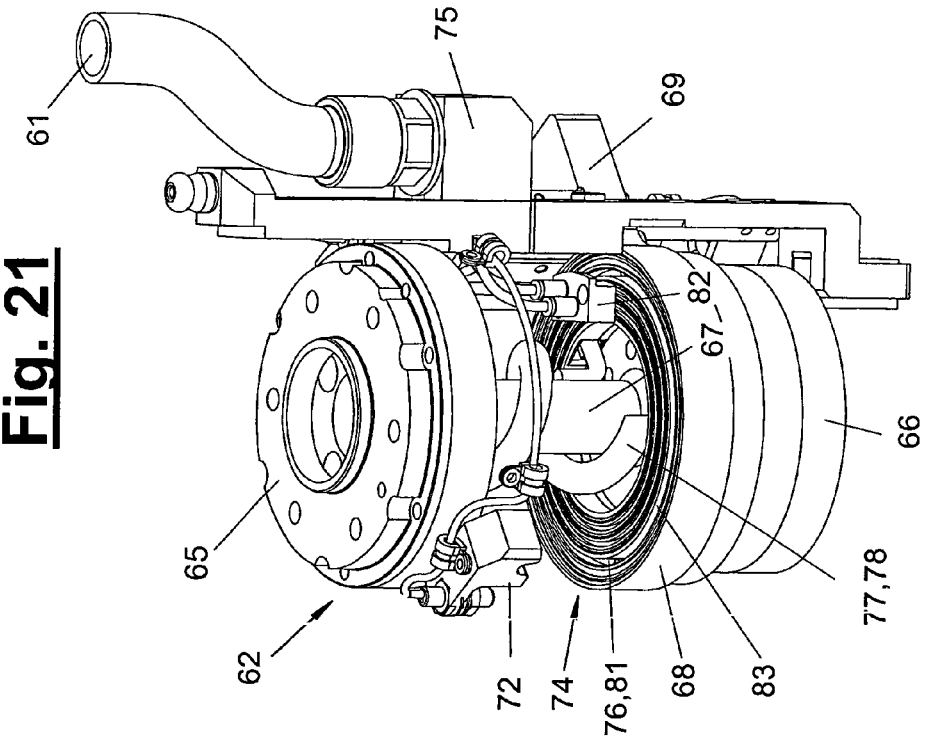
FIG. 21 is a perspective view of the opened rotary connection coupling.
Figure 20:
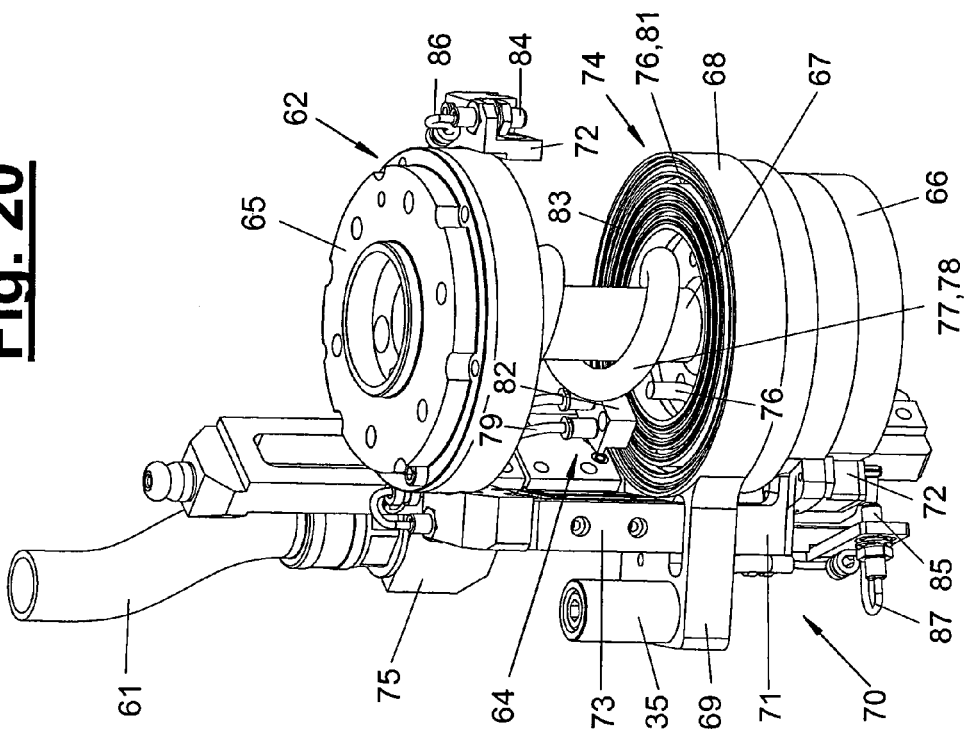
FIG. 20 is a perspective view of an opened rotary connection coupling.

FIGS. 10 and 11 show a variant of the working device (11) or applicator, which is equipped with such a modified rotary connection coupling (62) and which has, moreover, an attachment (30) of another design.

The rotary connection coupling (62) is arranged between the driven member (21) of the robot hand (19) and the tool or applicator (23). It has various connections (65, 66, 68) for the driven member (21), tool (23) and attachment (30). Connections (65, 66) are designed, e.g., as front-side flanges of the rotary connection coupling (62), at which the driven member (21) and the working head (25) of the tool (23) can be connected directly or possibly via the intermediary of a tool changer. Body (24) may be connected to the moment support (29) in such a way that they rotate in unison in this embodiment as well. The third connection (68) is formed by said rotary part, which is mounted rotatably by means of the pivot bearing (36). The mounting point is located at the rotary connection coupling (62) and at the coupling housing (63) thereof in this variant. The rotary part (68) is rotatable coaxially with the driven axis (22) and has on its periphery, at at least one point, a radially projecting base (69), to which the frame (35) for the attachment (30) can be detachably fastened by means of a suitable mount.

The coupling means (70) has a design similar to that in the first exemplary embodiment. It has a coupling drive (73) and a movable coupling element (71) at the rotary part (68) (or at the base (69). The movable coupling element (71) is designed, e.g., as a two-sided stop bolt, which passes axially through the base (69) and has at both ends a locking head each, which can engage a relatively stationary coupling element (72), which is designed, e.g., as a catch. One relatively stationary coupling element (72) is connected to the moment support (29) fastened to the hand housing (20) and forms the coupling point (37) to the moment support (29) and to the hand housing (20). The other relatively stationary coupling element (72) forms the other coupling point (38) and establishes a rotationally engaged connection with the driven axis (22) and with the applicator head (25). It may be arranged at a suitable point and is located, for example, in the proximity of flange (26) at the coupling housing (63). As an alternative, it may be arranged at the applicator head (25) or even on the other side of the coupling in the area of the flange (25) located there. Association with the coupling housing (63) or with the driven member (21) is possible here as well.

To change the coupling connection, the relatively stationary coupling elements (72), which are designed, e.g., as snap-in openings, are brought—by correspondingly actuating the hand axis VI or the driven axis (22)—into axially aligned positions in relation to the movable coupling element (71), which is axially displaced by actuating the drive (73), while it changes the rotational engagement with the coupling elements.

To ensure the coupling function, position transducers (84, 85) may be associated with the relatively stationary coupling elements (72). A change of the coupling engagement is possible only when at least one of the position transducers (84, 85) signals the correct position. In addition, it can be checked on the basis of the position transducers (84, 85) whether the change of the coupling engagement has taken place correctly and the stop bolt (71) dips into the catch (72) securely and in a positive-locking manner. The position transducers (84, 85) can be connected to the robot control by means of lines (86, 87) installed on the coupling housing (63) on the outside. They are connected for this to the line feed (61) and to a line connection (67), which will be explained below.

In a variant of the embodiment shown, the tool (23) may have any other design as desired. It may be, in particular, another tool, e.g., a welding tool, a bonding gun, a gripping means, a hemming tool or the like. Tool (23) also does not have to be divided into a body (24) and a working head (25) mounted rotatably therein, but it may be connected as an integrated tool to the flange (66) on the driven side of the rotary connection coupling (62).

The attachment (30) may also have any other shape as desired. FIGS. 10 and 11 show a variant with a camera system at frame (35). Attachment (30) also does not have to be a measuring means or a sensor system, but it may have another design as desired. It may possibly also have motion axes of its own. In the extended position of the robot hand (19) and in couplings of the rotary part (68) with the moment support (29), tool (23) and attachment (30) may also be rotated relative to one another about the aligned hand axes IV and VI or the driven axis (22). The angle of rotation of attachment (30) may be limited because of the moment support (29).

FIGS. 12 through 21 show, furthermore, an integrated line routing (74), which is of an independent inventive significance and can be combined especially well with the shown embodiment of the rotary connection coupling (62). Due to the integrated line routing (74), attachment (30) can be supplied with the needed media, electric currents being likewise defined as media in this connection. The currents may be power currents, control currents, signal currents or the like.

As is illustrated especially in the sectional views in FIGS. 16 and 18, the rotary connection coupling (62) has a hollow coupling housing (63), which is formed by the flanges (65, 66) on the front side and by an essentially cylindrical housing jacket on the circumferential side. The coaxial flanges (65, 66) are connected to one another by a duct (67) in a rotationally engaged manner and rigidly, said duct being of a shaft-like design and extending centrally and coaxially with the driven axis (22) through the cavity (64) of the coupling housing (63). The driving forces are transmitted via duct (67) and tool (23) is supported on the robot hand (19).

The jacket of the coupling housing (63) can be connected to the moment support (29) or to the hand housing (20) in such a way that they rotate in unison and has, at its upper border and lower border, a pivot bearing (88, 89) each coaxially with the driven axis (22). The sections in FIGS. 16 and 18 illustrate the arrangement. The upper connection or flange (65) can rotate relative to the housing jacket (63) via the upper pivot bearing (88). The lower pivot bearing (89) is arranged between the housing jacket (63) and the rotary part (68) and permits the relative rotation thereof.

There is a sufficient cylindrical free space for installing lines (77, 79) between duct (67) and the circumferential housing jacket. Lines (77, 79) may have different designs and be connected in different ways. Line (77) is designed, e.g., as a signal line, with which sensitive electric signals are transmitted from the attachment (30) and the integrated line routing (74) to the outside. The other line (79) is intended for operating materials or media, e.g., fluids or power or control currents. Such fluids may be, e.g., gases, especially compressed air, and liquids, e.g., hydraulic oil, coolant or the like.

The integrated line routing (74) has an outer line connection (75), which is located at a suitable point, e.g., at the moment support (29). The line routing (61), which is installed on the outside along the robot arm, can end here. Only the supply lines for the attachment (30) or additionally also supply lines for the tool (23) can be routed in the line routing (61), and they are then possibly led from the outer line connection (75) farther to the line connections (28) at the body (24). The lines enter the cavity (64) via a housing opening (80) from the outer line connection (75).

The integrated line routing (74) also has an inner line connection (76), which is located in the cavity (64) and may have various designs. For example, a spiral guide (78) of the line, which is installed in one or more turns through the cavity (64) and which leads from the external line connection (75) directly to an internal line connection (76) located at the rotary part (68), may be provided for the sensitive signal line (77). The spiral cable (67) may be wound in one or more turns around the duct (67). Due to the limited angle of rotation of the rotary part (68), which is smaller than 360°, the spiral guide (78) is opened and closed in its wound form in some areas only, and the deformations and loads are absorbed in the helical guide (78).

The one or more other lines (79) for operating materials may be transferred via a rotatable media coupling (81). The media coupling (81) may be designed for fluid type media and/or for electric currents. It may be, in particular, a multimedia coupling (81). It comprises a stationary line part (82), which is designed, e.g., as a brush head or as a media head, and a line part (83), which rotates coaxially with the driven axis (22) and which is designed, e.g., as a slip ring for electric currents, as a groove ring for fluid type media or the like. The stationary line part (82) is connected to the coupling housing (63) in the embodiment being shown and the rotating line part (83) is connected to the rotary part (68). The arrangement may also be reversed.

Various modifications of the embodiments shown and described are possible. In particular, individual components of the processing means or sealing means (9) may be omitted or replaced. The order of stations in the manufacturing plant (1) may be changed as well. Furthermore, other design embodiments of the components of the sealing means (9) and especially of the applicator (11) are possible. Other suitable motion units may be used instead of multiaxial manipulators (16). Opening and closing of the add-on parts (4) in the sealing station (2) may be done away with. The global or approximate measurement of the vehicle body (3) is also dispensable if sufficiently accurate positioning of the body can be ensured in another way, e.g., by a clamping means or the like.

While specific embodiments of the invention have been described in detail to illustrate the application of the principles of the invention, it will be understood that the invention may be embodied otherwise without departing from such principles.

The invention claimed is:

1. A working device for a multiaxial robot hand with a rotatable hand housing and with a driven member rotatable thereon, the working device comprising:
   connections for the driven member;
   a tool connected to said connections;
   an additional device connected to said connections;
   a rotary connection coupling comprising:
      a coupling housing with coaxial flanges, which are connected in a rotationally engaged manner and form said connections for the driven member to said tool;
      a rotary part, which forms the connection for said additional device, said rotary part being mounted rotatably at said coupling housing and said rotary part being rotatable coaxially with said coaxial flanges; and
      a moveable coupling element connected to said coaxial flanges and to said rotary part, said moveable coupling element being moveable to a position establishing a first coupled state, with said tool and said additional device coupled and rotating together, whereby the driven member rotates both said tool and said additional device and said moveable coupling element being moveable to a position establishing a second coupled state with said tool and said additional device rotatable in relation to one another, whereby the driven member rotates only said tool and said additional device is stationary relative to the hand housing.

2. A working device in accordance with claim 1, further comprising an integrated line routing for supplying said additional device.

3. A working device in accordance with claim 2, wherein: said coupling housing has a cavity accessible from the outside and from a rotary part for said integrated line routing.

4. A working device in accordance with claim 2, wherein said integrated line routing has a relatively stationary line connection outside said coupling housing and a line connection inside said coupling housing as well as connecting lines.

5. A working device in accordance with claim 4, wherein said line connection is arranged at at least one rotatable media coupling.

6. A working device in accordance with claim 5, wherein said media coupling is designed for fluid-type media and/or for electric currents.

7. A working device in accordance with claim 4, wherein a signal line is installed in a spiral guide between line connections.

8. A working device in accordance with claim 7, wherein said spiral guide is installed around a duct.

9. A working device in accordance with claim 1, wherein said movable coupling element of said rotary connection coupling has a coupling drive at said coupling housing and relatively stationary coupling elements at said tool or at the driven member, and at the hand housing or at a moment support located there.

10. A working device in accordance with claim 1, wherein said coaxial flanges are connected by a shaft-like duct passing through said cavity.

11. A working device applicator for a sealant at a flange of an add-on part of a vehicle body, the working device comprising:
   at least one multiaxial manipulator;
   a multiaxial manipulator hand connected to said multiaxial manipulator, said multiaxial manipulator hand having a rotatable hand housing and a driven member rotatable relative to said hand housing;
   a tool;
   an additional device; and
   a rotary connection coupling connected to said multiaxial manipulator hand, connected to said tool and connected to said additional device, said rotary connection coupling comprising a moveable coupling element, said moveable coupling element being moveable to a position establishing a first coupled state, with said tool and with said additional device coupled and rotating together and with said driven member rotating said tool and said additional device and said moveable coupling element being moveable to a position establishing a second coupled state, with said tool and with said additional device rotatable in relation to one another and with said driven member rotating only said tool and said additional device being stationary relative to said hand housing, said rotary connection coupling further comprising a coupling housing with coaxial flanges, which said coaxial flanges are connected in a rotationally engaged manner and form a connection of said driven member to said tool and said rotary connection coupling further comprising a rotary part, which said rotary part forms a connection from said driven member to said additional device, said rotary part being mounted rotatably at said coupling housing and said rotary part being rotatable coaxially with said flanges.

12. A working device in accordance with claim 11, wherein said tool comprises an applicator for a pasty or liquid sealant and said additional device comprises a measuring means.

13. A working device for a multiaxial robot hand with a rotatable hand housing and with a driven member rotatable thereon, the working device comprising:
- an additional device;
- a tool;
- a rotary connection coupling comprising:
  - a coupling drive and a moveable coupling element, said moveable coupling element being moveable via said coupling drive to a position establishing a first coupled state, with said tool and said additional device coupled and rotating together, whereby the driven member rotates both said tool and said additional device and, said moveable coupling element being moveable via said coupling drive to a position establishing a second coupled state, with said tool and said additional device rotatable in relation to one another, whereby the driven member rotates only said tool and said additional device is stationary relative to the hand housing;
  - a coupling housing with coaxial flanges, which are connected in a rotationally engaged manner, forming connections for the driven member to the tool; and
  - a rotary part, which forms the connection for the driven member to the additional device, mounted rotatably at the coupling housing, the rotary part being rotatable coaxially with the flanges.

* * * * *